United States Patent [19]
Breslow

[11] Patent Number: 4,472,713
[45] Date of Patent: Sep. 18, 1984

[54] OPTICAL ENCODER WITH INTEGRAL FLEXIBLE COUPLER

[75] Inventor: Donald H. Breslow, Framingham, Mass.

[73] Assignee: Itek Corporation, Lexington, Mass.

[21] Appl. No.: 318,810

[22] Filed: Nov. 6, 1981

[51] Int. Cl.³ .............................................. G01D 5/34
[52] U.S. Cl. ........................ 340/870.28; 250/231 SE; 464/182
[58] Field of Search ...................... 340/870.28, 870.29; 250/231 SE, 237 G; 33/1 PT; 464/71, 137, 182

[56] References Cited

U.S. PATENT DOCUMENTS

| | | | |
|---|---|---|---|
| 3,693,024 | 9/1972 | Hulle et al. | 250/231 SE |
| 3,728,551 | 4/1973 | Culver | 250/231 SE |
| 3,959,990 | 6/1976 | Golitz | 464/137 |
| 3,995,156 | 11/1976 | Angersbach et al. | 250/231 SE |
| 4,369,578 | 1/1983 | Ernst | 250/231 SE |
| 4,392,839 | 7/1983 | Aucktor | 464/182 |

Primary Examiner—James J. Groody
Attorney, Agent, or Firm—Homer O. Blair; Robert L. Nathans; Gerald H. Glanzman

[57] ABSTRACT

An optical encoder assembly includes an integral flexible coupler. A flange extending from the flexible coupler serves as a bearing retainer to hold a disc table and unitary bearing shaft in fixed axial position relative to the bearing. The bearing is further axially fixed relative to a stationary base which supports encoder disc illuminating and detecting optics. In a preferred form, the flexible coupler extends through the center of the encoder assembly, and a dust tube is positioned between the coupler and the encoder optics.

5 Claims, 1 Drawing Figure

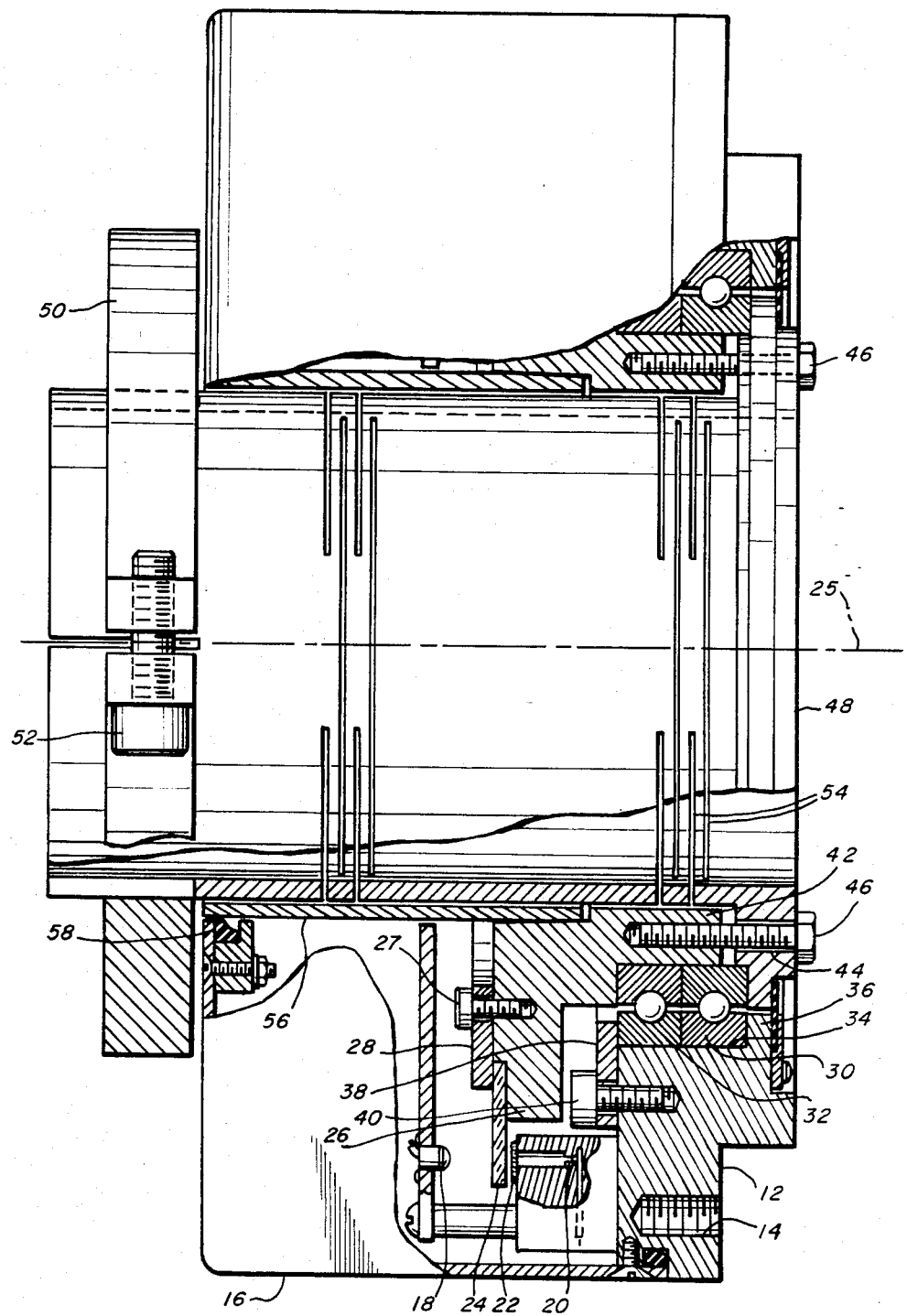

OPTICAL ENCODER WITH INTEGRAL FLEXIBLE COUPLER

DESCRIPTION

1. Technical Field

This invention relates to optical encoders and has particular application to hollow shaft encoders.

2. Background

A typical optical encoder includes a transparent disc on which one or more code tracks are inscribed. Each code track is illuminated, and the light which passes through the code track is detected through precision optical slits. The detected signals provide a high resolution indication of the angular position of the disc.

To provide a high resolution signal, the encoder disc must be precisely aligned with the optical slits and photodetector. To that end, the rotating disc and the stationary optical elements are assembled in a package under controlled conditions, using sophisticated equipment and procedures. That package, the optical encoder assembly, is mounted to the customer's machine to monitor the angular position of a shaft on that machine. The stationary portion of the assembly is mounted to some fixed support, and the rotating portion of the assembly is fixed to a driving shaft which is to be monitored.

In one conventional optical encoder assembly (not shown), ball bearings are positioned between a stationary base and a rotating hollow shaft. The shaft is axially retained on the ball bearing assembly by an outwardly extending flange on one end of the shaft and by a bearing retainer bolted to the other end of the shaft inside the encoder housing. The inner retainer also serves as a member (known as a disc table) to which the encoder disc is clamped.

To allow for any misalignment between the hollow shaft to which the encoder disc is fixed and the driving shaft which is to be monitored, a flexible coupler is generally used between the encoder assembly and the driving shaft. Because the flexible couplers are used almost universally, a coupler which is integral with the encoder assembly might in some applications provide a cost advantage and also minimize on-site assembly problems. An object of this invention is to provide such an integral encoder/coupler.

DISCLOSURE OF THE INVENTION

An optical encoder assembly has an encoder disc mounted to a disc table which rotates relative to an encoder base. A flexible coupler is an integral part of that encoder assembly. The coupler has a flange which is mounted to a discrete bearing shaft which is in turn fixed relative to the disc table. The flange extends radially beyond the shaft to serve as a bearing retainer and prevent axial movement of the shaft relative to the bearing.

In the preferred embodiment, the disc table comprises, in a one piece construction, an axially extending bearing shaft. The bearing is positioned between that shaft and the surrounding encoder base.

In the preferred form, the encoder assembly is hollow and the flexible coupler extends from adjacent the bearing through the center of the assembly to be clamped to a drive shaft at the opposite end of the coupler. A dust tube surrounds the flexible coupler and prevents contamination of the encoder disc.

BRIEF DESCRIPTION OF THE DRAWING

The foregoing and other objects, features and advantages of the invention will be apparent from the following more particular description of a preferred embodiment of the invention, as illustrated in the accompanying drawing. The drawing is not necessarily to scale, emphasis instead being placed upon illustrating the principles of the invention.

The single FIGURE is a side view of an encoder embodying this invention broken away to show the internal flexible coupler and to show the disc table, bearings and base in partial longitudinal section.

PREFERRED EMBODIMENT OF THE INVENTION

The optical encoder assembly shown includes a base 12 which is to be fixed to some stationary support by means of bolts in holes such as shown at 14. A cover housing 16 is fixed to the base 12 and provides an annulus enclosing both rotating and stationary optical elements.

The fixed optics within the housing 16 include at least one light source, such as a light emitting diode 18, and a photodetector 20. The photodetector is illuminated through a precision grating 22. An optical encoder disc 24 is mounted to a disc table 26 for rotation about a center axis 25. The disc 24 is fixed to the rotating disc table 26 by means of a clamping ring 28 retained by bolts such as shown at 27.

The disc is generally glass and has one or more annular code tracks inscribed thereon. A code track is illuminated by the LED 18 and the code track signal detected through the grating 22 provides a high resolution indication of the angular position of the code disc 24. That position indication in turn provides an indication of the angular position of a shaft which drives the encoder disc.

The disc table 26 is aligned by and rotates within two sets of preloaded ball bearing assemblies 30 and 32. The outer portions of those ball bearing assemblies are positioned against an inner surface 34 of the base 12. The bearings are retained against axial movement by means of an inwardly extending flange 36 on the base 12 and a retaining ring 38 fixed to the base by bolts such as shown at 40.

In conventional encoder assemblies, a rotating shaft is positioned within the bearing assemblies 30 and 32 and a disc table mounted to that inner shaft serves as an inner bearing retainer. In the present assembly, the disc table 26 comprises, in a one piece construction, an axially extending shaft 42. The bearing elements 30 and 32 which surround that shaft are retained against the disc table by an outer bearing retaining flange 44 bolted to the shaft 42 by bolts such as shown at 46. The bearing retaining flange 44 extends outwardly from a flexible coupler 48.

The flexible coupler extends through the center of the encoder assembly. A clamp 50 which may be closed by a bolt 52 is provided at the opposite end of the coupler. A driving shaft (not shown) from a machine which is to be monitored may extend from the right of the drawing through the coupler 48, and it is held fast by the clamp 50. Slits 54 are provided in the coupler 48 in a conventional fashion to allow for flexing. With that flexing, the optical encoder can be driven by a driving shaft which is slightly out of alignment with the encoder axis 25.

To prevent contamination of the encoder disc by dust particles and the like, a dust tube 56 surrounds the coupler 48 and is fixed by a press fit to the shaft 26. A seal 58 is clamped to the housing 16 to provide a seal between the housing and the rotating dust tube 56.

In operation, a driving shaft from a machine drives the coupler through the clamp connector 50. The coupler in turn drives the bearing shaft portion 42 of the disc table 26. The coupler flexes during rotation to prevent binding which would otherwise result with misalignment of the driving shaft and the encoder axis 26. The disc 24 is carried by the the table 26 and thus rotates with the driving shaft. As the disc 24 rotates its angular position is monitored by the stationary optical system including the LED 18 and the photodetector 20.

By forming the shaft 42 as an extension of the disc table 26 and by utilizing a flange on the flexible coupling as a bearing retainer, the present assembly eliminates the need for a separate shaft within the bearing assemblies 30 and 32. Further, the encoder disc 34 is mounted to its aligning shaft 42 with but a single joint, the glass metal interface between the disc 24 and disc table 26. By thus eliminating a part and corresponding joint in the encoder between the code disc and the driving shaft, this construction offers improvements in economy, ruggedness, and performance. The design is unusually compact, and as far as the user is concerned the encoder, bearing shaft and coupler operate as a single piece.

Although the flexible coupler is shown as an internal coupler, the coupler might also extend to the right of the drawing away from the encoder. A flange on the coupler would still serve as the bearing retainer.

While the invention has been particularly shown and described with referenced to a preferred embodiment thereof, it will be understood by those skilled in the art that various changes in form and details may be made therein without departing from the spirit and scope of the invention as defined by the appended claims.

I claim:

1. In an encoder having an annular encoder disk which rotates about a rotational axis:
    an annular disk table concentric with and rotatable about said axis for supporting said annular encoder disk;
    a flexible drive coupler concentrically positioned about said rotational axis for transmitting rotary motion therethrough for rotating said encoder disk and having an annular coupling means at outer portions thereof for directly connecting said flexible drive coupler to said annular disk table and for causing said disk table to directly drive said encoder disk due to rotary motion transmitted solely through said flexible drive coupler.

2. The combination as set forth in claim 1 wherein said annular coupling means further includes a ball bearing retaining member.

3. The combination as set forth in claim 2 further including a circular bearing, held in place by a flange portion of said retaining member, and having an inside diameter approximately equal to the inside diameter of said annular disk table.

4. The combination as set forth in claim 3 further including a rigid hollow cylindrical dust tube affixed to said annular disk table and rotatable therewith.

5. The combination as set forth in claim 4 further including a sealing member in contact with said dust tube.